United States Patent
Agranat

(10) Patent No.: US 8,599,647 B2
(45) Date of Patent: Dec. 3, 2013

(54) METHOD FOR LISTENING TO ULTRASONIC ANIMAL SOUNDS

(75) Inventor: Ian Agranat, Concord, MA (US)

(73) Assignee: Wildlife Acoustics, Inc., Concord, MA (US)

( * ) Notice: Subject to any disclaimer, the term of this patent is extended or adjusted under 35 U.S.C. 154(b) by 455 days.

(21) Appl. No.: 13/104,664

(22) Filed: May 10, 2011

(65) Prior Publication Data

US 2011/0273964 A1 Nov. 10, 2011

Related U.S. Application Data

(60) Provisional application No. 61/333,077, filed on May 10, 2010.

(51) Int. Cl.
*H04B 1/06* (2006.01)

(52) U.S. Cl.
USPC .......................................... 367/135

(58) Field of Classification Search
USPC ................. 367/135; 704/243, 221, 223, 204
See application file for complete search history.

(56) References Cited

U.S. PATENT DOCUMENTS

| 5,956,963 | A  | * | 9/1999  | Lerner  | 62/259.3 |
| 7,454,334 | B2 | * | 11/2008 | Agranat | 704/231  |
| 7,782,195 | B2 | * | 8/2010  | Agranat | 340/540  |
| 8,457,962 | B2 | * | 6/2013  | Jones   | 704/243  |
| 2005/0049876 | A1 | | 3/2005 | Agranat | |
| 2006/0064759 | A1 | | 3/2006 | Agranat | |
| 2007/0237342 | A1 | | 10/2007 | Agranat | |

FOREIGN PATENT DOCUMENTS

WO 2005024782 3/2005

\* cited by examiner

*Primary Examiner* — Mark Hellner
(74) *Attorney, Agent, or Firm* — Lando & Anastasi, LLP

(57) ABSTRACT

A method for listening to ultrasonic animal sound signals comprises: obtaining a plurality of input samples at an input sample rate, the plurality of input samples including at least one sequence of samples corresponding to an instance of an intermittently occurring animal sound signal; receiving a frame including at least two of the plurality of input samples; selecting a fraction of the samples as output samples, the fraction of the samples including a sample containing the at least one sequence of samples corresponding to an instance of an intermittently occurring animal sound signal; and transmitting the output samples at an output sample rate slower than the input sample rate.

4 Claims, 2 Drawing Sheets

METHOD FOR LISTENING TO ULTRASONIC ANIMAL SOUNDS

BACKGROUND

Several animals give calls or make other sounds in an audio frequency range which humans find to be normally undetectable or difficult to detect without aid. Perhaps best-known amongst these are bat echolocation calls and certain sea-mammal calls, though other animals are also known to use ultrasonic calls.

The typical echolocation call of a bat consists of a rapid series of short narrowband frequency-modulated whistles in the ultrasonic frequency range beyond human hearing. Calls across species vary from between 1 and 100 milliseconds in duration and between 10 and 120 kilohertz in pitch. Call rates are typically 10 per second while bats are navigating or searching for prey but can increase significantly when closing in on a meal.

The prior art includes a class of bat detectors known as time expansion detectors. These detectors typically buffer approximately 5 seconds of ultrasonic sound samples at a high sample rate after some trigger event, and then drain the buffer at a much slower sample rate (typically 10 or 16 times slower) over the subsequent 50 to 80 seconds producing output audio samples. The output is suitable for recording by a conventional audio recorder or playback through speakers or headphones. Time expansion bat detectors effectively divide the frequency information by the ratio between the input and output sample rates (e.g. by 10 or 16) and preserve all of the spectral, amplitude, and temporal information of the original signal. However, this method is not suitable for real-time bat monitoring because bat activity can not be monitored while the buffer is drained over relatively long periods of time.

SUMMARY OF INVENTION

According to aspects of an embodiment, a method for listening to ultrasonic animal sound signals comprises: obtaining a plurality of input samples at an input sample rate, the plurality of input samples including at least one sequence of samples corresponding to an instance of an intermittently occurring animal sound signal; receiving a frame including at least two of the plurality of input samples; selecting a fraction of the samples as output samples, the fraction of the samples including a sample containing the at least one sequence of samples corresponding to an instance of an intermittently occurring animal sound signal; and transmitting the output samples at an output sample rate slower than the input sample rate.

According to aspects of another embodiment, a method for listening to ultrasonic echolocation signals, comprising: obtaining a plurality of input samples at an input sample rate, the plurality of input samples including at least one sequence of samples corresponding to an instance of an intermittently occurring echolocation signal; receiving a frame including at least two of the plurality of input samples; selecting a fraction of the samples as output samples, the fraction of the samples including a sample containing the at least one sequence of samples corresponding to an instance of an intermittently occurring echolocation signal; and transmitting the output samples at an output sample rate slower than the input sample rate.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
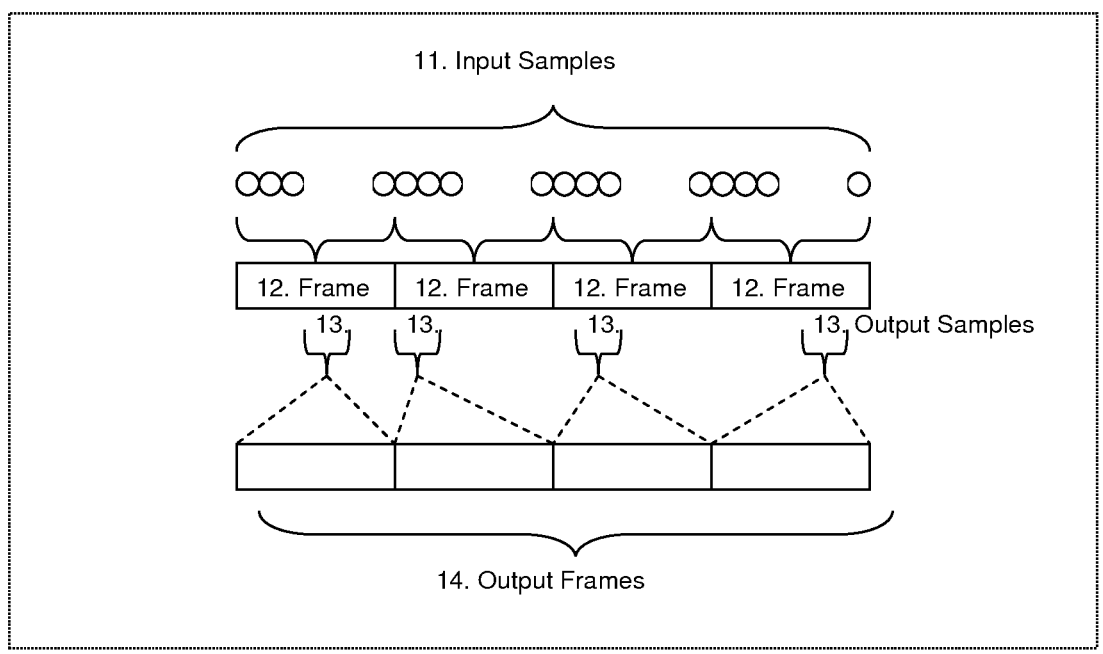
FIG. 1 is a signal structure diagram showing the arrangement of input and output samples according to aspects of embodiments.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

According to aspects of embodiments, a simple and efficient method manipulates the audio signal of live or recorded bat calls so that they can be heard by human ears in real time while preserving the harmonic structure and amplitude details of the original signal. The method is also well suited to other short-duration ultrasonic or high-pitched signals such as the vocalizations of rodents, insects, dolphins, birds, etc.

Aspects of embodiments operate on a continuous real-time basis using small buffers and selectively choosing the best samples to output at reduced sample rates.

The signal structure diagram of FIG. 1 shows an input stream of digitized audio samples at a sample rate of R samples per second (11). The input samples are then organized into consecutive frames of N consecutive samples each (12). For each frame, the best consecutive N/D samples are chosen as output samples (13). The output samples are then output at a rate of R/D samples per second to produce output frames (14).

"Best" consecutive N/D samples per frame are considered to be those N/D samples comprising short duration echolocation calls while the balance of the samples contain less important information such as the silent intervals between adjacent calls, the parts of calls containing less information, or intervals containing only background noise unimportant to the task at hand. There are many criteria that can be used for selecting the best consecutive N/D samples. One possible criterion is to maximize the root-mean-squared power levels after applying a high-pass filter to remove the low frequency components below the echolocation calls. A simplified criterion is to maximize the sum of absolute values of the samples.

The output samples are played back at a speed that is 1/D of the original speed, effectively dividing the frequency information by a factor of D. By choosing the best consecutive N/D samples in each frame, the short duration echolocation calls are effectively selected and time-expanded individually so they can be more easily heard in real-time.

A division ratio, D, of 16 is commonly used for bats because the resulting frequencies are well within the range of human hearing. The size of each frame N can be optimized to distinguish individual calls in a series. For example, a frame rate of around 40 frames per second can resolve the individual echolocation calls and inter-call gaps for call rates of 10 calls per second. With a sample rate R of 384,000 samples per second and a frame size N of 8,192 samples, the frame rate would be R/N, i.e. 46.875 frames per second. In this example, the best N/D is chosen, 512 samples per frame.

The output audio stream may have phase discontinuities as a consequence of combining discontinuous blocks of N/D samples together. The problem is less severe given the very short duration of calls. However, additional windowing and filtering of the output can reduce these effects. Additionally, output samples from frames with energy below some threshold can be clamped to zero to eliminate background static noise when there is no bat activity.

There are many possible variations of embodiments.

In one embodiment, 2×N samples are buffered at a time. A rolling window of N/D samples can be used to measure the root-mean-squared power levels of ultrasonic sounds present. For each new input sample, the power level of the rolling window is updated by adding the contribution of the new sample while subtracting the contribution of the sample which had been added N/D samples earlier. The maximum value and corresponding window position is tracked for N samples. After N samples, the window position corresponding to the maximum power level is used to choose the N/D output samples. This process is repeated for each frame of N samples.

In another embodiment, each frame can be organized into D consecutive blocks of N/D samples each. The best block of each frame can then be chosen to produce output samples. Only 3 blocks need to be buffered at any given time with one block buffer receiving new input samples, a second block buffer preserving the best block observed so far in the frame, and a third block buffer transmitting output samples from the previous frame.

Other variations are also possible. For example, the frame size N, the division ratio D, and the input sample rate R may vary from frame to frame. The variation may be predetermined, or may be selected on the basis of qualities of the signals received, for example based on how many samples appear to represent significant signal information. The selected output samples may not be contiguous. The number of samples chosen may be only approximately N/D. And the output sample rate may only be approximately R/D.

One feature of aspects of embodiments is that they selectively discard some samples before producing an output, in order to monitor continuously, rather than producing an output containing all samples with reduced monitoring coverage.

These methods can be embodied in a software program to convert ultrasonic recordings to audio suitable for human listening. Such a software program can be written and stored on media, as firmware in a read-only memory (ROM) or programmable ROM (PROM), or in any other suitable form, to execute on a general purpose central processing unit (CPU) or digital signal processing (DSP) unit. Such a CPU or DSP would be connected to the various peripheral circuits and systems required to perform the particular sensing, input, output, and control functions required, as is known.

Figure 2:
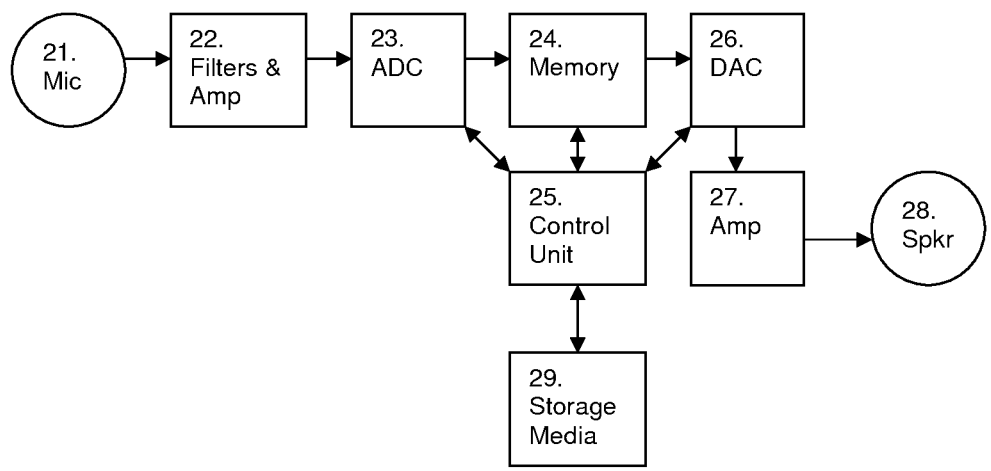
FIG. 2 is a block diagram of an apparatus according to aspects of embodiments.

In a particular system-level example, the method can be embodied in an apparatus for real-time listening of frequency divided bat calls in the field as illustrated in FIG. 2. A microphone sensitive to ultrasound (21) picks up sounds in the field. The signal is typically band pass filtered and amplified (22) to filter out non-ultrasonic sounds below some frequency and for anti-aliasing. The signal is then sampled and digitized by an Analog-to-Digital Converter (23) sampled at a sample rate R. The samples are forwarded to a memory buffer (24). A control unit (25) organizes each consecutive N/D samples into a block and each consecutive D blocks into a frame. For each frame, the block containing the strongest signal is forwarded to a Digital-to-Analog Converter (26) at a sample rate R/D. The analog output is then amplified by an output amplifier (27) and played on a speaker or headphones (28). Additionally, the apparatus may record the original ultrasonic input samples or the frequency divided output samples on media such as a removable flash card (29).

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for listening to ultrasonic animal sound signals, comprising:
   obtaining a plurality of input samples at an input sample rate, the plurality of input samples including at least one sequence of samples corresponding to an instance of an intermittently occurring animal sound signal;
   receiving a frame including at least two of the plurality of input samples;
   selecting a fraction of the samples as output samples, the fraction of the samples including a sample containing the at least one sequence of samples corresponding to an instance of an intermittently occurring animal sound signal; and
   transmitting the output samples at an output sample rate slower than the input sample rate.

2. A method for listening to ultrasonic echolocation signals, comprising:
   obtaining a plurality of input samples at an input sample rate, the plurality of input samples including at least one sequence of samples corresponding to an instance of an intermittently occurring echolocation signal;
   receiving a frame including at least two of the plurality of input samples;
   selecting a fraction of the samples as output samples, the fraction of the samples including a sample containing the at least one sequence of samples corresponding to an instance of an intermittently occurring echolocation signal; and
   transmitting the output samples at an output sample rate slower than the input sample rate.

3. The method of claim 2, wherein obtaining further comprises:
   receiving a bat echolocation signal.

4. The method of claim 2, wherein obtaining further comprises:
   receiving a sea-mammal echolocation signal.

* * * * *